July 20, 1937.    H. H. LUCKER    2,087,349
BEER KEG
Filed June 16, 1934
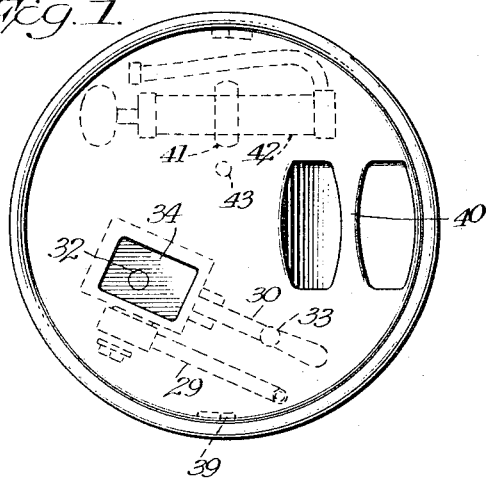
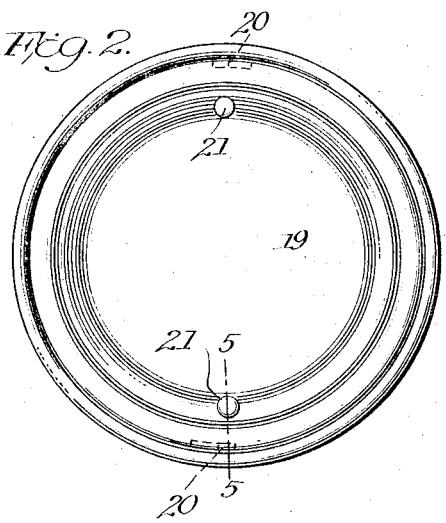
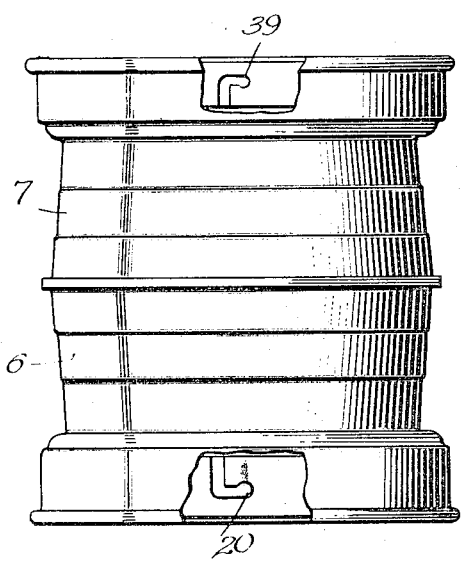
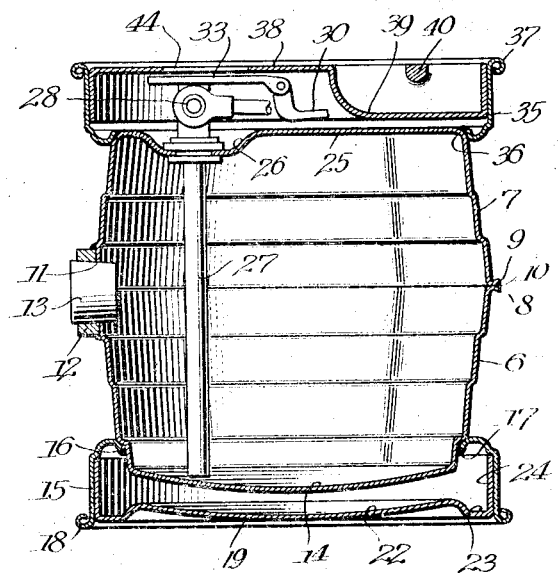
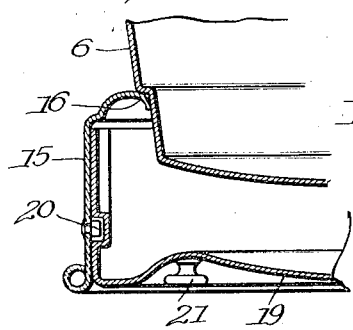
Herbert H. Lucker, Inventor
By Bacon & Thomas
Attorney Patented July 20, 1937

2,087,349

UNITED STATES PATENT OFFICE 2,087,349

BEER KEG

Hubert H. Lucker, Detroit, Mich.

Application June 16, 1934, Serial No. 730,949

2 Claims. (Cl. 220—20)

This invention relates to new and useful improvements in beer kegs.

The primary object of the invention is to provide a metal beer keg which is formed from a comparatively few number of parts and yet which is extremely strong and durable.

A further object of the invention is to provide the main body portion of a metallic beer keg by forming the same from a pair of oppositely arranged dished members, which may be pressed or stamped from suitable gauge material and wherein the edges of the two dished members are suitably joined for a seam.

A further object of the invention is to provide a beer keg with depressions or cavities at its opposite ends, one of said cavities being designed to receive and house the dispensing mechanism for the contents of the keg and wherein a cover is applied to the end of the keg to conceal the dispensing mechanism.

Still a further object of the invention is to provide a beer keg which is formed with a cavity or depression at one end adapted to be closed by a cover so as to form a compartment for receiving a refrigerating medium.

Other objects and advantages of the invention will be apparent during the course of the following description.

In the accompanying drawing forming a part of this specification, and in which like numerals are employed to designate like parts throughout the same:

Figure 1 is a top plan view of the beer keg embodying this invention;

Figure 2 is a bottom plan view of the beer keg;

Figure 3 is a side elevational view of the beer keg with portions of the end rims broken away to disclose a form of connection employed for attaching covers to the ends of the keg;

Figure 4 is a vertical sectional view of the beer keg disclosed in the preceding figures; and Figure 5 is a detailed vertical sectional view taken on line 5—5 of Fig. 2.

In the drawing, wherein for the purpose of illustration is shown a preferred embodiment of this invention, the numerals 6 and 7 designate respectively the opposed halves which are combined to form the main body of the beer keg. Each one of these halves is stamped or pressed from a suitable sheet metal blank so as to form the stepped, dished construction, as best illustrated in Fig. 4. The halves 6 and 7 are provided with mating flanges 8 and 9 respectively at their open ends and these flanges are united at 10 by means of welding, or the like, to form a seam between the two parts of the body of the keg. A suitable aperture 11 is formed in one side of the main body of the keg and is reinforced by a ring 12 which is centrally apertured to register with the aperture 11. This ring and aperture structure provides a bung-hole for receiving the bung or plug 13.

The half section 6 of the main body of the keg will be termed the bottom half for the keg, in use at the time beer is being dispensed therefrom, will be positioned with this half downwardly. The bottom wall 14 of this half is dished downwardly, as clearly illustrated in Fig. 4.

Surrounding this bottom end of the keg is an end ring or flange 15 which is provided with an inwardly and downwardly turned edge 16 adapted to be secured by welding 17 to the body of the keg. The outer edge of this end ring 15 is rolled to form a bead 18. The intermediate portion of the ring is of truly cylindrical formation.

A one-piece sheet metal cover 19 is adapted to be received within the cavity formed by the end ring 15 and is to be held in place by the bayonet slot connections 20, as clearly illustrated in Figs. 3 and 5. Handle members 21 are connected to the outer face of the cover 19 and may be used for assisting in connecting the cover to the end ring 15. Figs. 4 and 5 disclose the fact that the cover is provided with a central dished portion 22 which corresponds to the dished formation of the bottom wall 14 of the keg body. This central dished portion 22 of the cover is surrounded by an annular groove 23, while the margin of the cover is formed into a flange 24 which fits within the cylindrical portion of the end ring 15.

It will be appreciated that this end ring 15 and the cap 19 will function to form a compartment in which a refrigerating medium, such as crushed water ice or blocks of dry ice, may be positioned. It will be appreciated that the fit between the cover 19 and the interior of the end ring 15 will be such that gases will be permitted to escape from the compartment if dry ice is used. With the keg standing up on end, as illustrated in Fig. 4, the water which forms from water ice as it melts will be prevented from running out of the compartment as the marginal portion 24 of the cover extends upwardly almost the entire depth of the compartment.

The top end wall 25 of the keg is formed as an integral part of the top half 7 of the keg body. This top wall 25 is formed with a depression 26 which is centrally apertured to receive the feeding tube 27 of the valve control dispensing mechanism 28. This dispensing mechanism is illustrated in detail and claimed in my copending application, Serial No. 728,585, filed June 1, 1934. It therefore need not be specifically described in this application. It should be sufficient to state that the dispensing mechanism includes a discharge nozzle 29 which is pivoted to the main body or casing of the mechanism and is adapted to be swung into a position where the extremity of the nozzle will project beyond the side wall of the keg to enable beer to be drawn from the keg. A valve actuating handle 30 is attached to the casing of the mechanism and is capable of being moved into a position wherein the boss or projection 31 will register with an aperture 32 formed in the plate-like portion 33 of the casing. The valve stem, not shown, is located in this aperture 32. The plate 33 is designed to have adhesively secured to the upper surface thereof a revenue stamp 34, which is shown in Fig. 1. The movement of the valve actuating handle 30 into its operative position effects cancellation of the revenue stamp 34, as clearly described in my above identified application.

To finish off the upper end of the keg to correspond with the lower end, an end ring 35, of identical construction to the bottom end ring 15, is secured to the upper half 7 of the body of the keg by welding at 36. This end ring 35 is formed with an edge bead 37 and is shaped to provide a recess or cavity which receives and protects the dispensing mechanism 28.

For the purpose of housing this mechanism, a cover 38 is secured by bayonet slot joints 39 to the ring 35. This cover is shaped to house or receive the dispensing mechanism 28 and is provided with a depression 39 having a hand grip 40 formed therein to enable the keg to be conveniently carried from place to place during handling of the keg. Fig. 1 discloses a suitable spring clip 41 by means of which an air pump 42 may be secured to the under side of the cover 38. This pump is designed to be connected to the valve controlled coupling 43, shown in Fig. 1, for the purpose of placing the beer within the keg under pressure to enable the same to be dispensed. An opening or window 44 is formed in the end wall 38 for the purpose of displaying the revenue stamp 34 secured to the plate 33 of the dispensing mechanism.

As pointed out above, a compartment formed at the bottom of the keg may be employed for housing a refrigerating medium when the keg is being used for dispensing its contents or during transportation of the keg to keep the contents at proper temperature. The refrigerating medium may be placed within the cover 19 when the latter is disconnected from the keg after which the cover may be positioned as clearly illustrated in Fig. 4. During transportation periods, or the like, the top cover 38 should be positioned within the end ring 35. When it is desired to dispense the contents of the keg, the top cover 38 should be removed to expose the dispensing mechanism.

It is to be understood that a form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A beer keg construction of the type described, a main body portion formed of opposed dish-shaped halves joined at their edges by a lap welded seam, an end ring welded to the opposite ends of the body portion of the keg and shaped to project radially beyond the seam to prevent the latter from contacting a surface over which the keg is rolled, and a removable cover positioned within each end ring.

2. A beer keg formed of pressed metal comprising a body portion formed of opposed dish shaped sections joined at their edges by a seam, an axially projecting ring connected to each end of the body portion and shaped to project radially beyond the seam to prevent the latter from contacting a surface over which the keg is rolled, dispensing mechanism attached to one end wall of the body portion and received within the ring carried by such end of the keg, and a cover detachably connected to the end ring to conceal the dispensing mechanism.

HUBERT H. LUCKER.